March 12, 1940.  R. T. CLOUD  2,193,620
ATTENUATOR
Filed Sept. 20, 1937   3 Sheets-Sheet 1

INVENTOR
Raymond T. Cloud
BY Lyle S. Motley
ATTORNEY

March 12, 1940.                R. T. CLOUD                2,193,620
                                ATTENUATOR
                            Filed Sept. 20, 1937          3 Sheets-Sheet 2

INVENTOR
Raymond T. Cloud
BY Lyle S. Motley
ATTORNEY

March 12, 1940.  R. T. CLOUD  2,193,620
ATTENUATOR
Filed Sept. 20, 1937  3 Sheets-Sheet 3
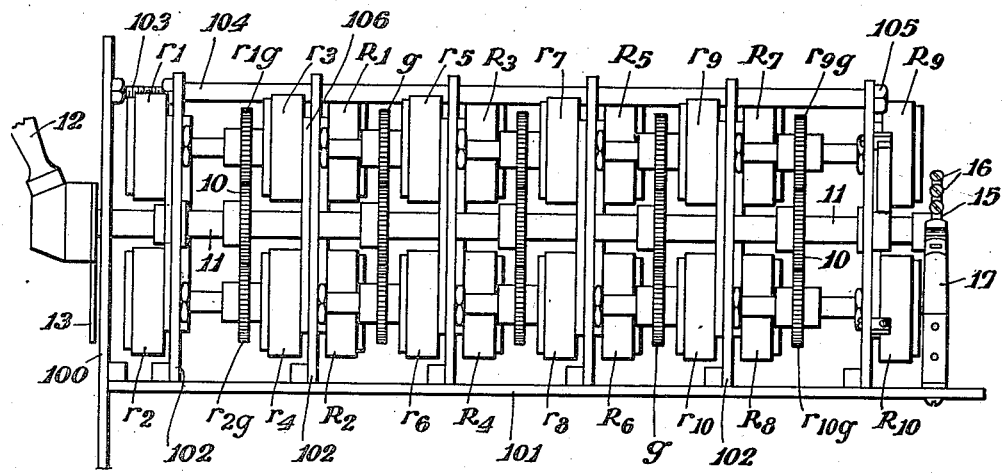
Fig. 3
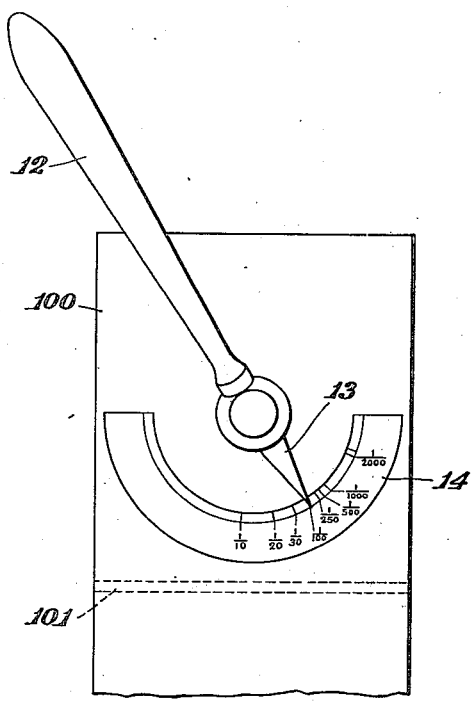
Fig. 4
Fig. 5
INVENTOR
Raymond T. Cloud
BY Lyle S. Motley
ATTORNEY Patented Mar. 12, 1940

2,193,620

UNITED STATES PATENT OFFICE 2,193,620

ATTENUATOR

Raymond T. Cloud, Los Angeles, Calif., assignor, by mesne assignments, to Stanolind Oil and Gas Company, Tulsa, Okla., a corporation of Delaware Application September 20, 1937, Serial No. 164,623

3 Claims. (Cl. 177—352)

The present invention relates to seismic surveying and particularly to an improved system for controlling the electric effects generated by the impingement of seismic waves on seismometers.

It is an object of my invention to provide an improved method and apparatus for attenuating the electrical effects produced in each of a plurality of amplifier channels leading from a plurality of spaced seismometers and for uniformly and synchronously decreasing this attenuation to produce an improved and more easily readable record. Other and more detailed objects of my invention will become apparent as the description thereof proceeds.

My invention will be described by reference to the accompanying drawings which illustrate certain preferred arrangements of apparatus for practicing the invention and wherein:

Figure 3 is a right side elevation of my improved attenuation controller with the side panel removed showing schematically the arrangement therein of the more important attenuator elements.

Figure 4 is a front elevation showing the single manual control lever, pointer, and scale for indicating the degree of attenuation.

Figure 5 is a rear elevation showing the transverse disposition of the continuously variable resistors about the central shaft and also showing the switch mechanism for operating the indicating means for indicating on the common record the degree of attenuation or degree of rotation of the variable resistors.

Figure 1:
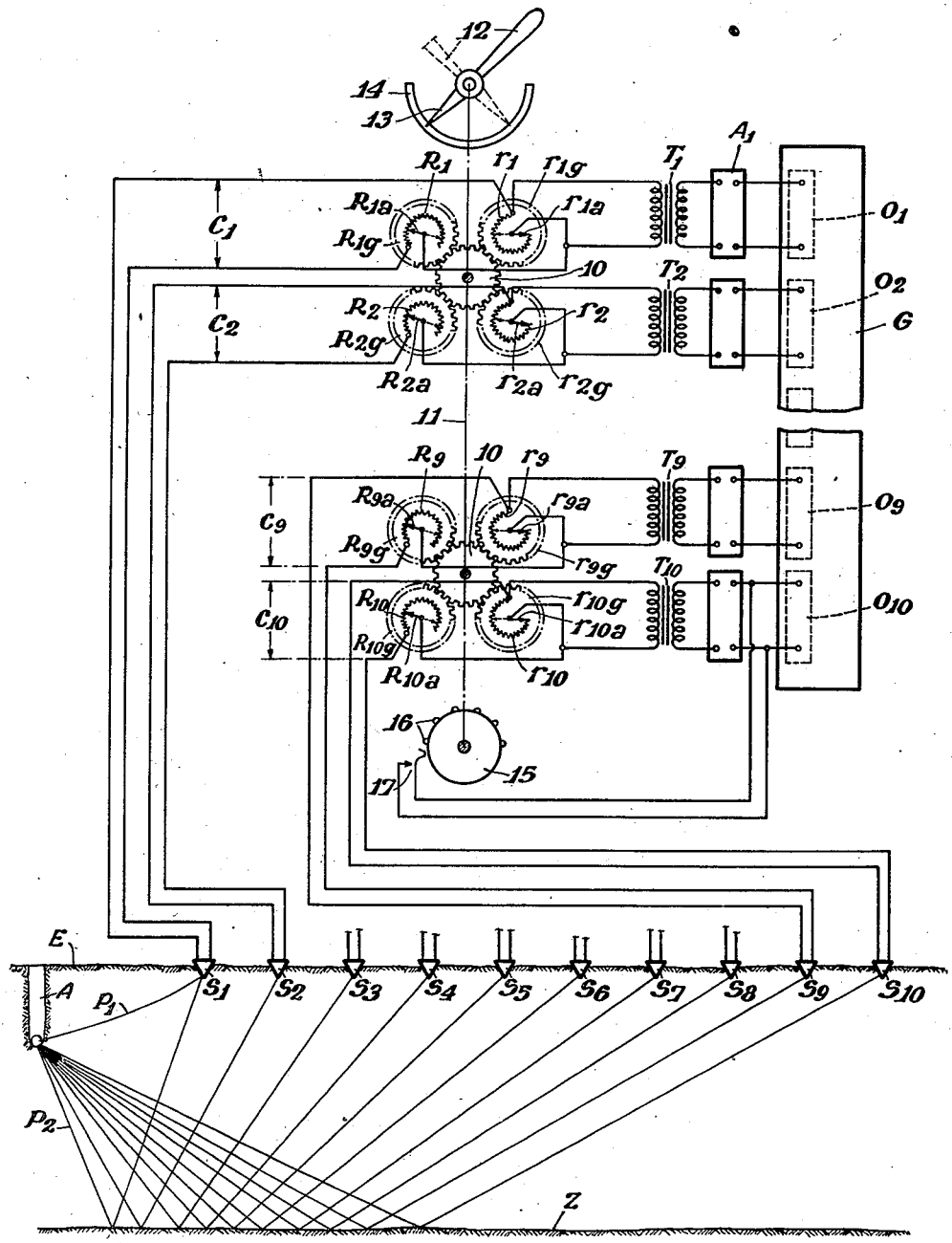
Figure 1 shows diagrammatically an arrangement of seismic apparatus, embodying my improved attenuation control.

Referring to Figure 1, there is represented an arrangement of apparatus for conducting a seismic surveying operation in accordance with the reflection method. This method consists essentially in determining the position and/or slope of certain subsurface geological strata by detonating a charge of explosive at or near the surface of the earth, detecting the seismic waves reflected from certain of the underlying strata by means of a plurality of seismometers progressively spaced from the shot point; controlling the magnitude of the electrical output of the several seismometers by a novel arrangement of attenuation resistances provided with a common drive for varying these resistances in synchronism with each other; and amplifying and recording the resulting electrical waves on a common record or film. A study and analysis of this common record according to known technique reveals valuable information regarding underlying strata such as position, faults and/or slope, etc. Certain of these underlying structures are known to those familiar with the art to be favorable to the accumulation of valuable deposits such as petroleum and it is this information which is ultimately desired.

At shot point A provision is made for detonating a charge of explosive at or below the surface of the earth E for the purpose of creating seismic waves in the underlying earth structure. Spaced at varying distances from shot point A are a plurality of seismometers $S_1$ to $S_{10}$ located in accordance with any of the known techniques. For the purpose of simplicity I have indicated these pick-up devices as being positioned in a straight line at equally spaced move-out distances in the order $S_1$ to $S_{10}$. Each of these seismometers $S_1$ to $S_{10}$ represents either an individual instrument or a group of such instruments, but for simplicity will be referred to as a single seismometer. Each seismometer is of a type capable of converting seismic waves into electric waves. The electric waves produced by each seismometer are attenuated and amplified by means of a corresponding amplifier channel $C_1$ to $C_{10}$.

Since the arrangement of elements in each of these channels is essentially the same, channels $C_3$ through $C_7$ have been omitted from the drawings and the description will be simplified by giving a detailed description of channel $C_1$. The signal current generated by seismometer $S_1$ in response to the reception of a wave impulse is passed from the seismometer through a novel attenuator arrangement (later to be described in detail), through input transformer $T_1$, one or more amplification stages, indicated generally at $A_1$, and thence to a recorder string $O_1$ of a recorder G.

Each of the other channels $C_2$ to $C_{10}$ is arranged in a like manner and effects the operation of a corresponding recorder string $O_2$ to $O_{10}$. The recorder G is arranged to photograph the movements of all the strings side by side on a common record, or film F (Figure 2) in a well-known manner.

In operation the first waves to reach the seismometers will usually be those that are refracted through the earth, as for example A to $S_1$ roughly as shown by path $P_1$. At the same time surface waves are traveling along or near the surface of the earth E to seismometer $S_1$ and still other waves are being reflected from an underlying stratum Z along a path generally indicated by $P_2$. Usually the distances and velocities are such that the arrival of the refracted waves at a seismometer is followed in sequence by the arrivals of surface waves and reflected waves. Thus the recorded impulses from each of the seismometers shows first a high energy refracted wave, then a surface wave and then reflected waves, the latter usually being of low energy compared with the former two waves and gradually dying out in strength with the elapse of time following the shot.

Figure 2:
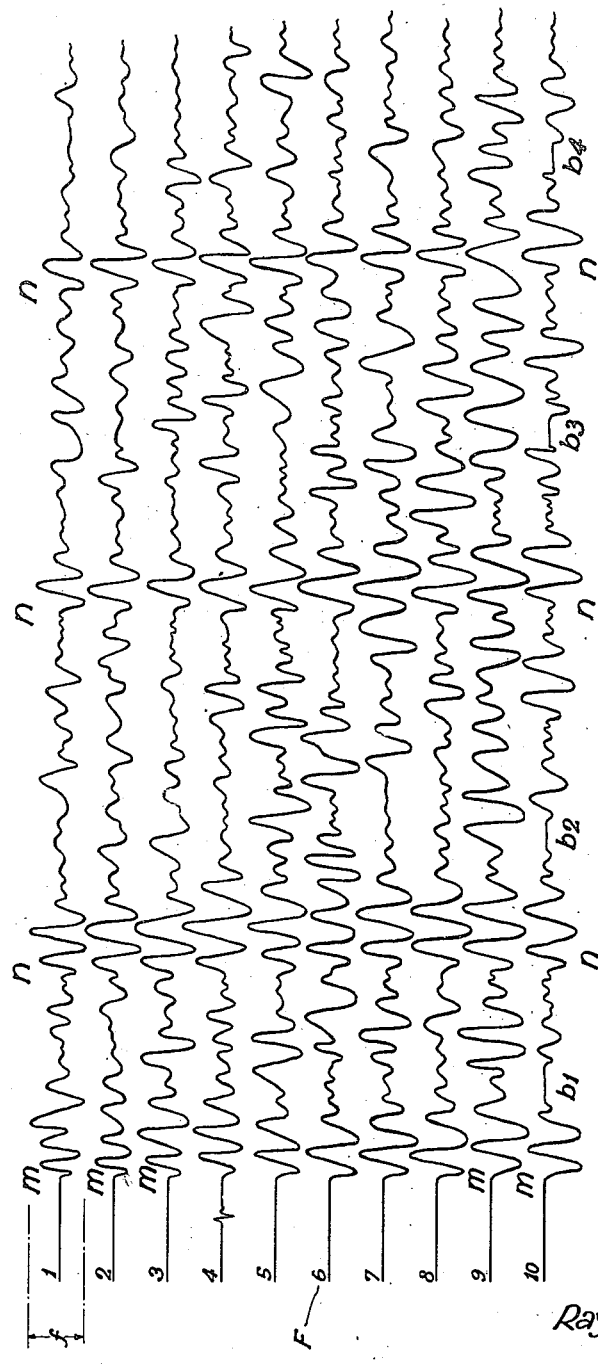
Figure 2 shows a film containing ten seismograms recorded in accordance with my invention.

The record or film F to be of most value in geophysical prospecting must show a clear reproduction of the instant of arrival of the first refracted wave as well as a clear picture of each of the reflected waves, the former being necessary in order to make certain weathering corrections. This means that the first high energy refracted wave must be photographed within the narrow width "$f$" of that portion of the film devoted to one of the ten strings (Figure 2). There is one string for each of the ten channels.

For the above reasons it becomes necessary to reduce the amplitude of the signal delivered from the seismometer to the recorder or to an amplifier stage before reaching the recorder string when the refracted wave is being received and to reduce this attenuation gradually during the period in which the relatively weaker and rapidly subsiding reflected waves are being recorded. It is also of importance that the attenuation in each of the channels $C_1$ to $C_{10}$ be the same at any given instant and that the variations be effected synchronously, if a comparison of the seismograms is to serve the desired purpose.

The attenuator arrangement for each channel includes a first variable resistance connected in shunt across the input coil of the transformer and a second variable resistance connected in series therewith. The shunt resistance for channel $C_1$ is designated $r_1$ while the shunt resistances for channels $C_2$, $C_9$ and $C_{10}$ (the equipment, except for the seismometers, of channels $C_3$ to $C_8$ being broken away for the purpose of simplifying the showing) are designated respectively $r_2$, $r_9$ and $r_{10}$. The series resistance for channel $C_1$ is designated $R_1$ while the series resistances for channels $C_2$, $C_9$ and $C_{10}$ are designated respectively $R_2$, $R_9$ and $R_{10}$. Each of these resistances is of the type which can be continuously varied without interruption. Shunt resistances $r_1$, $r_2$, $r_9$, and $r_{10}$ are shown provided with wiper arms $r_{1a}$, $r_{2a}$, $r_{9a}$ and $r_{10a}$ respectively for varying the values thereof. Series resistances $R_1$, $R_2$, $R_9$ and $R_{10}$ are likewise shown provided with wiper arms $R_{1a}$, $R_{2a}$, $R_{9a}$ and $R_{10a}$ respectively for varying the values thereof. Gears $10$, mounted on central shaft $11$ under the control of operating handle $12$, are shown in co-operation with side gears $r_{1g}$, $r_{2g}$, $r_{9g}$ and $r_{10g}$ for operating wiper arms $r_{1a}$, $r_{2a}$, $r_{9a}$ and $r_{10a}$. Gears $10$ are likewise shown in cooperation with side gears $R_{1g}$, $R_{2g}$, $R_{9g}$ and $R_{10g}$ for operating wiper arms $R_{1a}$, $R_{2a}$, $R_{9a}$ and $R_{10a}$. Special attention is directed to the fact that the gear arrangement is such that the shunt resistances are increased while the series resistances are being decreased and vice versa. This is of particular significance (as will later appear) with respect to maintaining constant impedance on the seismometer side of the attenuators.

To begin an operation wiper arms $r_{1a}$, to $r_{10a}$ and $R_{1a}$ to $R_{10a}$ are positioned as shown in dotted lines to provide the maximum attenuation for the reception of the high energy refracted waves. Subsequent to the reception of the high energy wave the operator moves handle $12$, rotating shaft $11$ to increase the value of the shunt resistances $r_1$ to $r_{10}$ and to decrease the value of the series resistances $R_1$ to $R_{10}$. The degree of attenuation or the ratio of the output voltage of the seismometer $S_1$ to the voltage across the input coil of transformer $T_1$ is controlled in predetermined steps as indicated by the pointer $13$ on dial $14$ (Figures 1 and 4).

From the above description it is seen that my attenuator mechanism is preferably composed of 10 L-pad attenuator elements mechanically coupled so that the attenuation of each pad is identical. It is to be understood, however, that I contemplate the use of any number of channels wherein the attenuation is synchronized in accordance with my invention.

The use of an L-pad attenuator rather than a simple rheostat or potentiometer is valuable because on one side of such an attenuator the impedance can be made constant, regardless of the attenuation. In the arrangement shown in Figure 1 the attenuators are placed to keep constant impedance across the seismometer terminals, i. e., the sum of $r_1$ and $R_1$ is constant at all times. This is of importance in that it keeps the amount of electrical damping in the seismometer constant.

The L-pad has the additional advantage over a simple rheostat or potentiometer that the attenuation varies in a substantially straight line manner whereas with a simple rheostat this is not true. However, a simple rheostat in each channel or any other synchronized attenuation means can be used in practicing my invention.

In practice it has been found desirable in certain cases to employ a variable impedance as well as variable attenuation. This can readily be done by suitably proportioning the values of resistance at the various portions of the arm travel or employing what is known as a taper resistance.

I have shown my attenuation control mechanism positioned in the respective channels directly following the seismometers, but it will appear that in some cases it may be desirable to locate this mechanism after a first amplification stage.

With further reference to Figure 1, it will be seen that a disc $15$ is mounted on the rear end of shaft $11$. This disc $15$ is provided with a series of cams $16$ spaced about the periphery of the disc, which cams operate to close switch $17$, which places a short circuit temporarily across one string of the recorder. On the common record F the extent of rotation of shaft $11$ and hence the degree of attenuation at any given time can be determined by observing on the particular trace employed the instants at which the string was shorted.

Referring to Figure 2, representative seismograms for the respective channels $C_1$ to $C_{10}$ are shown in side by side relation for one series of waves. The refracted waves are indicated by $m$ and the subsequent reflected waves are indicated by $n$. Breaks $b_1$ to $b_4$ on trace $18$ indicate the position of the attenuator at the particular time. One break $b_1$ indicates an attenuation of 1/2000, while $b_4$, for example, indicates the minimum attenuation with handle $12$ at the extreme right.

It is important to note that while I have shown the breaks $b_1$ to $b_4$ on trace 10 for the purpose of simplicity in presentation on the drawing, I contemplate in actual practice employing one of the more central traces. In actual practice the end strings will not be used for the breaks $b_1$ to $b_4$ since they alone are employed in the depth calculations, hence, must never be "killed" during the record. As a matter of fact a separate string may be used for this purpose. However, the need for strings is usually too great to use a separate one for recording the attenuator position only.

While I have shown a manual lever 12 for operating my attenuator it will be apparent that a clock or escapement mechanism can be employed for operating the same automatically. Such a mechanism can have its operation initiated either in response to the shot or in response to the receipt of the first high energy waves in a manner as more fully disclosed in my copending application Serial No. 125,297, filed February 11, 1937.

In Figures 3 to 5 there is shown an attenuation controller in accordance with my invention. Front panel 100 has extending at right angles thereto bottom or base panel 101 on which is supported a plurality of upright mounting panels 102. Bolts 103 pass through openings adjacent the upper corners of these mounting panels and are provided with spacing collars 104 and nuts 105. A shaft 11 is disposed centrally of these panels 102 and is journaled in openings formed therein.

The stationary cases of variable resistances $R_1$ to $R_{10}$ and $r_1$ to $r_{10}$ are arranged about the shaft 11 and the movable wiper arms "$a$" thereof (Figure 1) are geared to the shaft 11 for synchronous rotation by central gears 10 and side gears $g$. The resistances are mounted on auxiliary panels 106 (Figures 3 and 5) provided with slots 107 which slip over bolts 108 in the mounting panels 102 to facilitate the removal of these resistances in groups for ready inspection and replacement.

Enclosing panels (not shown) are provided to keep out the dust. One of the side enclosing panels supports the necessary junctions (not shown) for connecting the variable resistances in the various channels.

While I have described my invention in connection with a specific embodiment thereof it is to be understood that this is by way of illustration rather than by way of limitation and my invention is not confined thereto but only to the appended claims which should be construed as broadly as the prior art will permit.

I claim:

1. Apparatus for recording seismic waves comprising a plurality of spaced seismometers for converting seismic waves into electrical waves, a plurality of channels for amplifying and transmitting said electrical waves to a recorder, a recorder arranged to record the waves from the respective channels on a single record for comparison, and attenuation control means in each of said channels for reducing the strength of the high energy waves, said attenuation control means being operative to reduce gradually the degree of attenuation as the input wave energy becomes less, said attenuation control means comprising a shunt resistance across each of said channels, a second resistance in series with one side of each of said channels, and means for increasing the value of each of said shunt resistances while at the same time reducing the value of each of said series resistances.

2. Apparatus for recording seismic waves comprising a plurality of spaced seismometers for converting seismic waves into electrical waves, a plurality of channels for amplifying and transmitting said electrical waves to a recorder, a recorder arranged to record the waves from the respective channels on a single record for comparison, and attenuation control means in each of said channels for reducing the strength of the high energy waves, said attenuation control means being operative to reduce gradually the degree of attenuation as the input wave energy becomes less, each of said attenuation control means comprising a continuously variable resistance, means connecting all of said variable resistances for synchronous adjustment to effect matched attenuation in each of said channels, and means operable in accordance with the movement of said last-named means for indicating on said common record the extent of said movement, thus showing the degree of attenuation in relation to the seismograms.

3. Apparatus for recording seismic waves comprising a plurality of spaced seismometers for converting seismic waves into electrical waves, a plurality of channels for amplifying and transmitting said electrical waves to a recorder, a recorder arranged to record the waves from the respective channels on a single record for comparison, and attenuation control means in each of said channels for reducing the strength of the high energy waves, said means being operative to reduce gradually the attenuation as the input wave energy becomes less, said means comprising a shunt resistance across each of said channels, a second resistance in series with one side of each of said channels, and means for increasing the value of said shunt resistance while at the same time reducing the value of said series resistance, said means comprising mechanism for effecting the operation of all of said resistances in unison, and means operable in accordance with the movement of said mechanism for indicating on said common record the extent of said movement, thus showing the degree of attenuation in relation to the seismograms.

RAYMOND T. CLOUD.